(12) United States Patent
Servida (10) Patent No.: US 9,796,608 B2
(45) Date of Patent: Oct. 24, 2017

(54) PLANT FOR DESALINATING WATER OF A WATER SUPPLY SYSTEM AND METHOD FOR DESALINATING WATER OF A WATER SUPPLY SYSTEM BY MEANS OF SAID PLANT

(75) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 718 days.

(21) Appl. No.: 14/232,285

(22) PCT Filed: Jul. 6, 2012

(86) PCT No.: PCT/IB2012/001355
§ 371 (c)(1),
(2), (4) Date: Jan. 13, 2014

(87) PCT Pub. No.: WO2013/008080
PCT Pub. Date: Jan. 17, 2013

(65) Prior Publication Data
US 2014/0144790 A1    May 29, 2014

(30) Foreign Application Priority Data

Jul. 13, 2011 (IT) .............................. PD2011A0239

(51) Int. Cl.
*C02F 1/44* (2006.01)
*C02F 1/46* (2006.01)
(Continued)

(52) U.S. Cl.
CPC ............ *C02F 1/4604* (2013.01); *C02F 1/004* (2013.01); *C02F 1/006* (2013.01); *C02F 1/008* (2013.01);
(Continued)

(58) Field of Classification Search
CPC ...... B01D 61/02; B01D 61/025; B01D 61/08; B01D 61/10; B01D 61/12; B01D 61/027;
(Continued)

(56) References Cited

U.S. PATENT DOCUMENTS 3,493,496 A * 2/1970 Bray ...................... B01D 61/08
137/206
3,616,921 A * 11/1971 Bray ...................... B01D 61/08
210/195.2
(Continued)

FOREIGN PATENT DOCUMENTS

JP    H09195328    7/1997

*Primary Examiner* — Pranav Patel
(74) *Attorney, Agent, or Firm* — Mark M. Friedman (57) ABSTRACT

Plant for desalinating water of a water supply system, which comprises one or more tanks for accumulating water (2) in an immiscible manner, in order to store a softened supply thereof, provided with a first inlet connection (3) and with a first outlet connection (4) respectively connected to a feeding pipe (5) connected to the water supply system (50) and to an extraction pipe (6) for supplying users. The plant (1) also comprises a filtering unit (10) for water softening, for example obtained with a flow-through condenser (10") or with a reverse osmosis membrane filter (10'), connected in parallel to the tank (2) with second inlet connection (11) and second outlet connection (12) respectively hydraulically connected to the first inlet connection (3) and to the first outlet connection (4) of the tank (2). Circulating means (13) are provided which can be activated to force at least one water flow to be treated to pass through the filtering unit (10), producing a filtered water flow, which is progressively stored in the tank (2) according to a filling direction (VI) thereof. Operatively, the feeding pipe (5) of the water supply system (50) forces, when the user requests water, a water flow intended for use to flow through the tank (2), causing the at least partial evacuation of the filtered water volume
(Continued)

that was stored therein in an immiscible manner, in an evacuation direction (V2) opposite the filling direction (VI) with which the filtered water flow had been previously stored in the tank 2.

11 Claims, 2 Drawing Sheets

(51) Int. Cl.
    *C02F 1/469*     (2006.01)
    *C02F 9/00*     (2006.01)
    *C02F 1/00*     (2006.01)
    *C02F 101/10*     (2006.01)
    *C02F 101/16*     (2006.01)

(52) U.S. Cl.
    CPC ............ *C02F 1/441* (2013.01); *C02F 1/4691* (2013.01); *C02F 9/005* (2013.01); *B01D 2313/50* (2013.01); *C02F 1/001* (2013.01); *C02F 2101/101* (2013.01); *C02F 2101/16* (2013.01); *C02F 2101/163* (2013.01); *C02F 2201/002* (2013.01); *C02F 2209/005* (2013.01); *C02F 2209/05* (2013.01); *C02F 2209/40* (2013.01); *C02F 2301/022* (2013.01); *C02F 2303/16* (2013.01)

(58) Field of Classification Search
    CPC .... B01D 61/14; B01D 61/145; B01D 61/147; B01D 61/18; B01D 61/20; B01D 61/22; B01D 2313/90; B01D 2313/06; B01D 2313/20; B01D 2313/50; B01D 2311/02; B01D 2311/04; C02F 1/441; C02F 1/442; C02F 1/444; C02F 2103/08; C02F 9/005; C02F 1/006
    See application file for complete search history.

(56) References Cited

U.S. PATENT DOCUMENTS

| | | | | |
|---|---|---|---|---|
| 4,626,346 | A * | 12/1986 | Hall | ........................ B01D 61/08 210/110 |
| 4,784,771 | A * | 11/1988 | Wathen | ............... A61M 1/1656 210/126 |
| 5,282,972 | A * | 2/1994 | Hanna | .................. B01D 61/025 210/137 |
| 5,490,921 | A * | 2/1996 | Ishimura | ............... B01D 61/04 210/149 |
| 6,001,244 | A | 12/1999 | Pipes | |
| 2007/0045159 | A1 | 3/2007 | Lee | |
| 2009/0173691 | A1 * | 7/2009 | Oklejas, Jr. | .......... B01D 61/025 210/637 |
| 2011/0011802 | A1 * | 1/2011 | Maydan | .................... C02F 1/02 210/652 |

* cited by examiner

PLANT FOR DESALINATING WATER OF A WATER SUPPLY SYSTEM AND METHOD FOR DESALINATING WATER OF A WATER SUPPLY SYSTEM BY MEANS OF SAID PLANT

FIELD OF APPLICATION

The present invention regards a plant for desalinating water of a water supply system, and a method for desalinating water of a water supply system in particular by means of said plant, according to the preamble of the respective independent claims.

The above plant and method are mainly intended to be employed in a domestic environment in order to soften the water of the water works distributed through the water supply system.

In such domestic setting, there is usually the need to use water with low mineral content, i.e. water having low salt content, for food purposes and above all for drinking, and softened water for specific applications such as machines for washing, especially for dish and clothes washing machines. Drinking water is usually purchased in bottles, whereas the water for specific applications is often softened by means of suitable devices situated inside or outside the household appliances. Very hard water produces limescale deposits on taps, in sanitary systems, in showers etc., consequently requiring periodic cleaning and maintenance operations.

Due to its clear simplicity of installation and practicality of use, and due to the substantial lack of maintenance requirement, the plant and the method, object of the present invention, can be usefully employed for all the applications in domestic setting (both for drinking and for feeding household appliances, and more generally for all the needs of an apartment, of a house or of a condominium) given that it is adapted to supply softened water for any one use type, such as for home or professional kitchens, e.g. bar, restaurant or cafeteria kitchens, or even for serving artisanal shops such as bakeries, confectioners etc.

The aforesaid plant and method are therefore advantageously inserted in the industrial field for producing domestic and professional equipment for treating water, as well as in the hydraulic sector for the installation of components for typically hydraulic use such as tanks and valves and for obtaining connections to the water supply system; they are also inserted in the construction field, due to the possibility to install parts of the plant adapted to allow the distribution of the softened water inside building structures, such as in floors or in walls, in particular installable during renovations or when building new structures.

STATE OF THE ART

As is known, numerous plants are present on the market known as "decalcifiers" or "softeners" or more generally as "purifiers" which have the main object of reducing the water hardness level, i.e. substantially reducing the content of calcium and magnesium dissolved in the water.

Such plants can be positioned below the sink, usually in the kitchen, or they can be situated separately, substantially having the shape of a small furniture piece or household appliance.

They can be formed by a filtering unit, which usually introduces water into a dedicated tank for accumulating water of hermetic type, a unit for cooling the filtered water, a unit for carbonizing the filtered water for producing sparkling water, a unit for sterilization, e.g. by means of a UV lamp, as well as a unit for producing ice. Usually, the water treated by such plants can be drawn from the dedicated tank for accumulating water, through a dedicated tap, separate from that provided for the sink.

Such filtering plants generally employ filtering means obtained with mechanical filters, with active carbon cartridges, with ionic exchange resins, or more frequently with reverse osmosis membranes.

More in detail, as is known, the reverse osmosis filtering plants force the pressurized water to pass through a semipermeable membrane which allows the passage of the pure (permeate) water and retains most of the salts (retained or concentrated). Such plants are usually composed of multiple filters in series with each other having different characteristics; for example, the combined use is known of an active carbon cartridge filter interposed in series with reverse osmosis cartridge filters having meshes with different micrometer dimensions.

Usually, the filtering plants intended for the production of filtered water for food use, such as that described in the U.S. Pat. No. 5,147,533, provide a dedicated tank for accumulating water and a system for distributing water from the tank; this because the water is treated with rather slow filtering processes, such that the desalinated water production speed is incompatible with a use requiring large flow rates, like that generally required with the opening of a tap (even if this is usually for limited time intervals).

Such plants can employ complex connection systems in order to provide the user with water from the water supply system or with the filtered water stored in the tank for accumulating water, or even advantageously ice water. An example of one such complex connection system is described and illustrated in the U.S. Pat. No. 5,660,720.

In order to avoid the use of tanks for accumulating water, filtering plants are also widespread, in particular reverse osmosis plants, which are rather voluminous and capable of treating (due to high pressures) large flow rates of water, e.g. on the order of 1 liter per minute. Nevertheless, such plants are rather heavy and have proven unsuitable for domestic use due to the presence of high power pumps; the latter cause noise and vibrations that are usually not well tolerated in the home setting where they are intended to work.

Otherwise, if the plant is intended to serve household appliances or the water supply system of a building, for example, it will generally suffice that it produce a low softening of the water; therefore, it will be mounted in line with the equipment or with system to be served, without requiring the presence of a tank for accumulating water.

The latter filtering plant type is for example associated with machines for washing, such as clothes and dish washing machines; in this case, a hermetically closed container is generally provided, intercepted by the water circuit and containing cationic resins capable of retaining the positively-charged calcium and magnesium ions in order to reduce the water hardness level. More in detail, the calcium and magnesium ions, dissolved in the water in an undesired quantity in the form of $Ca^{++}$ and $Mg^{++}$ cations, are exchanged in the cationic resin filter with the sodium ions $Na^+$ present in the cationic resins contained in the softener.

Such plant type (lacking tank) can of course also be provided for filtering the water of a sink, such as in the plant described in the patent EP 616975 which employs an active carbon filter for treating the water exiting from a tap.

The water processing plants described above and their functioning method for desalinating water from the water supply system have proven in practice that they do not lack drawbacks.

The filtering plants, in particular for producing water for food use, are provided as said with their own water distribution system, generally comprising a tank for accumulating water and a dedicated tap.

Such circumstance makes such plants rather impractical and unpopular, as users have to deal with new equipment to be managed and maintained.

On the other hand, the filtering plants, in particular for feeding water supply systems or washing appliances (clothes or dish washing machines etc.), which treat the water in line without requiring the presence of a tank for accumulating water, do not ensure the reduction of the salinity to the desired level.

A further drawback of these known plants lies in the fact that they must be subjected to frequent and periodic maintenance in order to be maintained perfectly functioning and prevent the considerable decrease of water softening performances over time. Indeed, due to the need to carry out frequent maintenance operations, such appliances are not very popular on the market.

In addition, the possible presence of a tank of salts to be frequently filled, and the presence of a container for the resins which also must be periodically substituted, do not make the appliance very hygienic, such that means must be used for removing bacteria in order to ensure the healthiness of the water, usually obtained with UV lamps placed on the appliance delivery.

A further drawback of the filtering plants of known type lies in the low softened water production capacity, except with the use of very bulky and costly plants.

On the other hand, the plants for desalinating the water, which use the main technique of reverse osmosis for producing softened water without using a tank for accumulating water, require the consumption of a considerable amount of energy for producing the entire requested water amount in a brief time period.

PRESENTATION OF THE INVENTION

Therefore, the problem underlying the present invention is that of overcoming the drawbacks of the abovementioned prior art by providing a plant and a method for desalinating water of a water supply system, which are of practical use.

Another object of the present invention is that of providing a plant and a method for desalinating water of a water supply system which are able to meet, in a simple and functional manner, the normal requirements of water for food use or for overall civilian use, for which they were designed.

Another object of the present invention is that of providing a plant for desalinating water of a water supply system that is inexpensive to obtain and manage.

Another object of the present invention is that of providing a plant for desalinating water of a water supply system which requires extremely limited maintenance.

Another object of the present invention is that of providing a plant and a method for desalinating water of a water supply system which operatively are entirely safe and reliable.

Another object of the present invention is that of providing a plant for desalinating water of a water supply system with little bulk and which can be easily inserted below the sink, in case of application for food use, or in a structure of the building, in case of application for serving the water supply system of a room, house, condominium or apartment which it is adapted to serve.

BRIEF DESCRIPTION OF THE DRAWINGS

The technical characteristics of the finding, according to the aforesaid objects, can be clearly found in the contents of the below-reported claims, and the advantages of the same will be more evident in the following detailed description, made with reference to the enclosed drawings, which represent several merely exemplifying and non-limiting embodiments thereof, wherein:

DETAILED DESCRIPTION OF A PREFERRED EMBODIMENT

With reference to the enclosed drawings, the plant for desalinating water, object of the present invention, is indicated in its entirely with the reference number 1.

The plant 1, according to the invention, lends itself to being employed in a domestic setting inside homes as well as in artisanal shops or premises in order to soften the water of the water supply system, allowing an optimal use thereof in all possible applications thereof.

With the term "hardness level", it is substantially intended to indicate a value that expresses the content of ions, mainly calcium and magnesium, due to the presence of their soluble salts dissolved in the water.

The plant 1, object of the present invention, is intended to reduce the water hardness level as well as eliminate or considerably reduce many other substances such as nitrates, chlorides, sulphates and ammonia.

The plant, object of the present invention, comprises one or more tanks 2 for accumulating the filtered water, of immiscible type, each adapted to store a softened water supply.

Each of such tanks 2 is provided with a first inlet connection 3 and with a first outlet connection 4, respectively connected to a feeding pipe 5 of the water supply system 50, in order to supply the plant 1 with water from the water supply system, and to an extraction pipe 6, for transporting the water flow of the tank 2 to the users.

The extraction pipe 6 is intercepted by at least one tap 7, the latter expression intending any one member for intercepting the extraction pipe 6 which can selectively control a request for filtered water flow towards any one user, whether a piece of equipment or a sink.

Each tank for accumulating water in an immiscible manner 2 is for example advantageously obtained with a coil of wound tube 2' having section with diameter preferably ranging from 5 to 30 mm.

For example, in order to obtain a 100 liter tank, about 320 meters of a wound tube 2' made of flexible rubber can be employed, with external diameter of 22 mm, internal diameter of 20 mm and hence a volume of about 0.31 l/meter.

Figure 1:
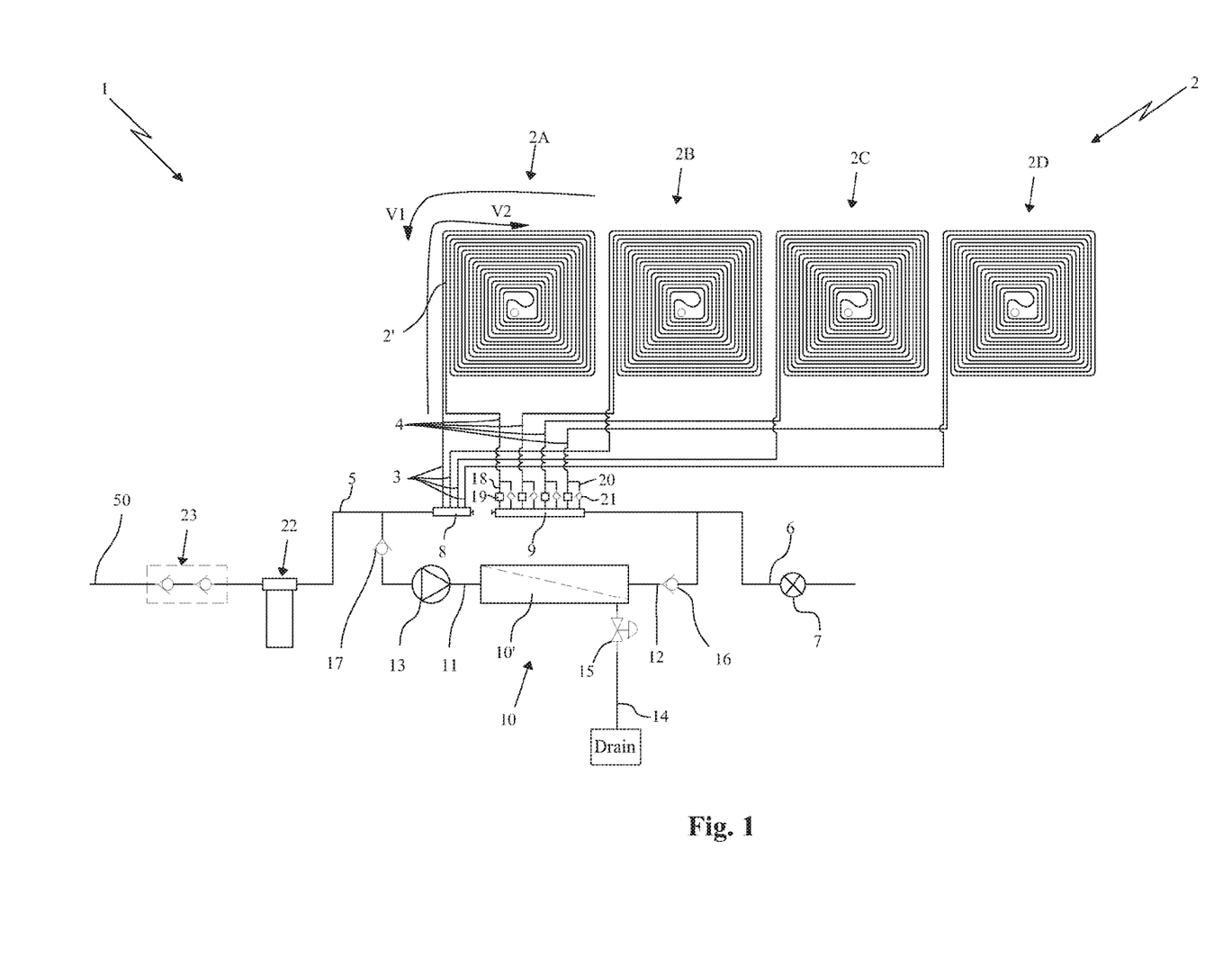
FIG. 1 shows a first functioning scheme relative to a first embodiment of the plant for desalinating water of a water supply system according to the present invention with a filtering unit constituted by a reverse osmosis membrane filter.
Figure 2:
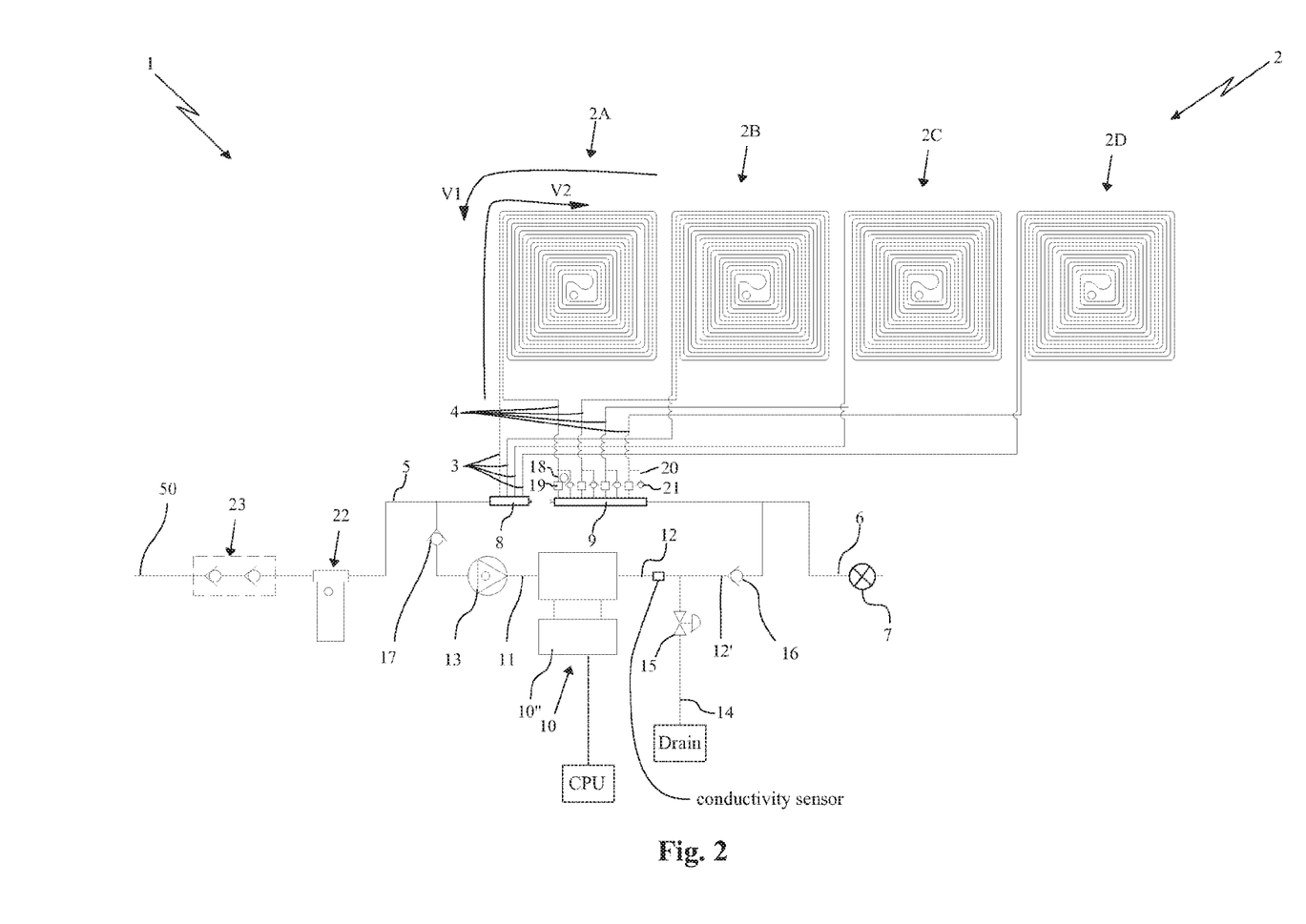
FIG. 2 shows a second functioning scheme relative to a second embodiment of the plant for desalinating water of a water supply system according to the present invention, with the filtering unit constituted by a flow-through condenser.

In order to avoid excessive load losses inside the tank 2, this can be divided into multiple modules, each constituted by a tank for accumulating water in an immiscible manner (e.g. four tank modules 2A, 2B, 2C and 2D in accordance with the embodiments of the enclosed figures) connected in parallel to each other with the respective first inlet connections 3 connected to a common inlet manifold 8 and with the respective first outlet connections 4 connected to a common outlet manifold 9.

Advantageously, the inlet manifold 8 and the outlet manifold 9 are each provided with a plurality of connections for the hydraulic connection of a selectable variable number of tanks for accumulating water (2A, 2B, 2C and 2D), in turn constituted by preassembled modules with preferably box-like shape, advantageously provided with inlet connections and outlet connections that are easily and smoothly connectable to the connections of the manifolds. In this manner, the installer technician of the plant 1, object of the present invention, does not have to be particularly specialized in the plant application, and can be for example represented by a generic plumber or an operator in the building field.

The modularity and the simplicity of installation of the tanks for accumulating water (2A, 2B, 2C and 2D) and of the relative manifolds 8, 9 allows an easy installation thereof below a sink, e.g. in a dedicated drawer, in case of rather low volumes of filtered water requested and particularly adapted for food use of the plant 1, as well as inside a wall or below the floor, in case of rather high volumes of filtered water requested and particularly suitable for any use in an apartment, house or building.

Of course, without departing from the protective scope of the present patent, each immiscible tank 2 can be differently obtained, even in another manner and for example by means of a containment chamber divided via a plurality of elements (such as separators or spherules) into a plurality of wells or channels capable of making the water flow with substantially laminar velocity, dividing it in an immiscible manner.

The plant 1, object of the present invention, also comprises at least one filtering unit 10 for water softening, which is connected in parallel to the tank 2 by means of a second inlet connection 11 and a second outlet connection 12 respectively hydraulically connected to the first inlet connection 3 and to the first outlet connection 4 of the tank for accumulating water 2.

With the expression "hydraulically connected", it must of course be intended that the second inlet connection 11 and the second outlet connection 12 are directly connected to the first inlet connection 3 and to the first outlet connection 4, i.e. to the latter through at least one section of the feeding pipe 5 and the extraction pipe 6 as in the examples reported in the enclosed figures.

The filtering unit 10 can be obtained with any one known appliance for purifying and particularly for desalinating water, for example a reverse osmosis membrane filter 10', a flow-through condenser 10", an active carbon filter, an ion exchange resin filter, an electrodialysis appliance or other filtering equipment of known type.

Also provided are circulating means 13, preferably constituted by a pump mounted on the second inlet connection 11, for feeding the filtering unit 10, and activatable by a logic control unit (not illustrated) to force a water flow to be treated to pass from the second inlet connection 11 to the second outlet connection 12 through the filtering unit 10; in this manner, a filtered water flow is produced which flows from the second outlet connection 12 of the filtering unit 10 towards the first outlet connection 4 of the tank 2, being progressively stored in the latter in an immiscible manner with a corresponding filtered water volume.

As the filtered water flow continues to arrive in the tank 2, the latter stores it with substantially laminar flow, without mixing it with that already contained according to a filling direction V1 directed from the first outlet connection 4 to the first inlet connection 3.

When the aforesaid tap 7 is situated in open or at least partially open position, the feeding pipe 5 of the water supply system 50 forces, with the supply system pressure (usually several bars), a water flow intended for use to flow through the tank for accumulating water 2 from the first inlet connection 3 towards the first outlet connection 4 until it is conveyed to flow into the extraction pipe 6; this causes the at least partial evacuation of the filtered water volume that had been stored in the tank 2 according to an evacuation direction V2 opposite the filling direction V1.

In accordance with a preferred embodiment of the present invention, the plant 1 comprises a drain duct 14 for a washing flow intercepted by a solenoid valve 15 and hydraulically connected to the filtering unit 10 (whether directly in accordance with FIG. 1, or indirectly through a section of the second outlet connection 12 in accordance with the embodiment of FIG. 2) in order to remove from the latter encrustation deposits that have accumulated during its functioning.

A first check valve 16 is placed to intercept the second outlet connection 12 in order to prevent the draining of the tank 2 through such second outlet connection 12 when the solenoid valve 15 is open.

Upstream of the pump 13 on the second inlet connection 11, a second check valve 17 is advantageously mounted.

In the case of multiple tanks in parallel, the inlet manifold 8 is connected to the inlet connections 3 of the respective tanks (2A, 2B, 2C, 2D) by means of two branches in parallel, or more in detail:

by means of corresponding filling branches 18, each intercepted by a flow adjuster 19 adapted to uniformly distribute to the respective tanks (2A, 2B, 2C, 2D), through the first outlet connections 4, the filtered water flow coming from the filtering unit 10 through the second outlet connection 12;

and by means of corresponding emptying branches 20 connected in parallel to the filling branches 18 and each intercepted by a third check valve 21.

The emptying branches 20 by-pass the flow adjusters 19 when the tap 7 is open, and the water flow intended for use flows through the tank for accumulating water 2 towards the extraction pipe 6, supplying the user with the requested flow, first administering the final volume of filtered water that has been stored in the tank 2 in the evacuation direction V2 opposite the filling direction V1.

Functionally, when the tap 7 is closed and there is no water consumption by the user, the pump 13 by means of the check valve 17 draws the water flow to be treated from the tank 2 and forces it to pass through the filtering unit 10, deionizing it so as to obtain a filtered water flow that, passing through the first check valve 16, reaches the tank 2 through its first outlet connection 4, so as to store therein in an immiscible manner a filtered water volume that is progressively increasing, with filling direction V1 opposite the direction V2 in case of evacuation.

In the case of multiple tanks in parallel (2A, 2B, 2C, 2D), the flow rate adjusters 19 balance the filtered water flow produced by the filtering unit 10 between the different tanks in parallel (2A, 2B, 2C, 2D), within which the suction of the pump 13 progressively creates new volume for the incoming filtered water.

When the tap 7 is closed, the logic control unit is also susceptible, in particular cyclically (regeneration step described below) if provided in the functioning cycle of the filtering unit 10, to open the solenoid valve 15 and to discharge a washing water flow forced by the circulating means 13, and in particular sucked by the pump, to cross through the filtering unit 10 itself in order to remove the encrustation deposits that have accumulated therein during a previous service step.

The first check valve 16, in such plant configuration, prevents the water of the tank 2 from emptying through the second outlet connection 12 and the drain duct 14.

Moreover, functionally, when the tap 7 is open, there being a water flow request by the user, the filtering unit 10 is by-passed and the flow of water from the water supply system is sent to the tank 2, forcing the liquid volume contained therein to be discharged towards the evacuation duct 6 with evacuation direction V2 opposite the filling direction V1; this means that the final volume of filtered water to be accumulated in the tank 2 is the first to be sent to the user.

This allows emptying the tank 2 towards the user by first supplying the entire filtered water volume contained therein and then only afterwards possibly supplying the water that is not yet filtered, contained in the same tank 2; then, once the entire water volume has been evacuated that was accumulated in the tank 2 at the time of tap 7 opening, the supply system water is provided directly, unfiltered.

Therefore, when there is a request for water flow intended for use, there is a free passage between the water supply system 50 and the user through the tank 2, advantageously without requiring the water flow to be forced through the tank 2 with dedicated pumps. The flow rate of the water provided to the user is not limited by the filtered water flow rate which the filtering unit 10 is able to supply, nor is it limited by the size of the circulating means 13 mechanically and operatively associated with the filtering unit 10 in order to achieve the water filtering. Hence, the circulating means 13 can also be constituted by a pump with low power, such as a vane pump with performances of 0.2 liters/minute, since the time intervals in which the tap 7 is closed and the filtering unit 10 with the pump 13 can work by generating filtered water are greater than the usually brief time intervals when the tap 7 is open to serve the users.

In accordance with the embodiment illustrated in FIG. 1, the filtering unit 10 is formed by at least one reverse osmosis membrane filter 10', connected upstream of the second inlet connection 11 and downstream of the second outlet connection 12. The latter conveys the water flow that crossed through the filter 10' itself, is intercepted by the first check valve 16 and is hydraulically connected to the first outlet connection 4 of the tank for accumulating water 2 in order to convey in the latter a softened water flow treated by the reverse osmosis membrane filter 10'.

The drain duct 14, intercepted by the solenoid valve 15, conveys the washing flow which has been forced by the pump 13 to cross through the reverse osmosis membrane filter 10', evacuating it in the drain of the water supply system 50.

Periodically, it is necessary to wash the filter 10' with a filtering water flow, to which an acid product can be added for removing the encrustation deposits (limescale) which have accumulated during the step of servicing the filter 10', or an alkaline agent and/or a surfactant product can be added for removing organic substances and biofilms. For such purpose, suitable injection means can be advantageously provided, preferably associated with the second inlet connection 11 for injecting such products or additives to the washing flow.

The tank 2 remains advantageously at the pressure of the permeate of the filter 10' and therefore at the pressure of the water supply system 50, since the first check valve 13 isolates the filtering unit at the permeate pressure.

The pump 13 draws the water from the feeding pipe of the water supply system 50 or from the tank 2 through its first inlet duct 3, balancing the pressure of the tank 2 with that of the water supply system 50. In the case of functioning of the filter 10' in service step for producing filtered water, the overpressure created by the pump 13 in the tank 2 pushes the liquid contained therein to close the circuit towards the same pump 13. Otherwise, in the case of function of the filter 10' in regeneration step, or at the same time as the passage of a washing flow through the filter 10', the feeding of the water to the pump 13 will substantially arrive from the water supply system 50 since the second outlet connection 4 is closed downstream by the tap 7 and by the first check valve 16. Otherwise, in accordance with the embodiment illustrated in FIG. 2, the filtering unit 10 is formed by at least one flow-through condenser 10" connected upstream of the second inlet connection 11 and downstream of the second outlet connection 12. The latter conveys the water flow that crossed through the condenser 10" and is divided into at least one service duct 12', intercepted by the first check valve 16 and hydraulically connected to the first outlet connection 4 of the tank 2, in order to convey in the latter a softened water flow treated by the condenser 10", and into at least one drain duct 14, intercepted by the solenoid valve 15, connected to the drain of the water supply system 50 and susceptible of conveying the washing flow for cleaning the condenser 10".

The aforesaid flow-through condenser 10" comprises, in a per se conventional manner, a plurality of electrodes electrically connected, by means of suitable commutators, to a DC direct current power supply unit. The latter charges the contiguous electrodes with different polarities, in a manner so as to define a plurality of pairs of facing electrodes which form the armatures of the same number of condensers in series, and electric fields are established therebetween.

The electrodes are obtained with superimposed and facing layers of conductor material, separated from each other by separator layers within which the water flow to be treated flows, such water flow containing the ions that one desires to at least partly remove.

The conductor layers that form the electrodes are made of a conductor material with porous structure, or with a formation of surface pores that offer a considerable surface area of exchange with the liquid, such as spongy active carbon. In accordance with a preferred embodiment of the invention, the electrodes comprise a layer of semi-permeable material, which can be associated in various ways with the conductor material layer.

The separator layers can in turn be constituted by highly porous, non-conductive materials, capable of isolating the electrodes, allowing the passage of the fluid flow; such materials can include a porous synthetic material or other non-conductive spacer materials such as glass fiber or nylon fabric.

The two service 12' and drain 14 ducts, into which the second outlet connection 12 is divided, are cyclically affected by the passage of treated and washing water flow, in accordance with the operative modes of the condenser 10" well known to the man skilled in the art and better specified below.

The flow-through condenser 10" is power supplied by the direct current power supply unit through an integrated circuit control board of the logic control unit mentioned above; such board controls, in the various operating steps of the functioning cycle of the condenser 10', typically by means of semiconductor switches, the voltage applied to the electrodes by means of suitable connection commutators.

Such functioning cycle can for example provide, in an entirely conventional per se manner well known to the man skilled in the art: a service step, wherein initially the power supply unit charges the contiguous electrodes with different polarities in order to bring them to a constant operation voltage equal to (for example) 1.6 V; and then subsequently, with the electrodes charged, by actuating the circulating means 13 the power supply unit forces the fluid flow to be treated to pass through the condenser 10", by means of the second inlet connection 11 and the second outlet connection 12.

During the service step, the solenoid valve 15 is closed and the removal of the ions (particularly calcium and magnesium) from the water takes place due to the fact that the latter are attracted by the electrode with opposite polarity, and they gradually accumulate on such electrode. In this step, the service duct 12' of the second outlet connection 12 feeds the tank for accumulating water 2 with a flow that comes to progressively accumulate without being mixed.

Once the programmed saturation of the electrodes with the ions present in the water has been reached, a regeneration step is provided, wherein with the electrodes deactivated, the washing fluid flow is forced to pass into the condenser 10" by the circulating means 13 with consequent removal of the ions accumulated on the electrodes in the previous service step, and then into the drain duct 14 of the second outlet connection 12.

During this step, there is the opening of the solenoid valve 15 of the drain duct 14. The flow that passes into the drain duct 14 is to be considered as waste, and it is therefore sent to the normal drain provided by the water supply system 50.

With the term "deactivated" used above in reference to the electrodes, it must be intended all those possible voltage conditions present at the electrodes in the regeneration step such as: short-circuited electrodes, electrodes charged with reverse polarity, electrodes not connected to the power supply unit.

All the aforesaid charge and discharge steps are managed by the board of the power supply unit in a per se known manner.

The CPU logic control unit controls the various operating steps of the flow-through condenser 10". Advantageously, the CPU is connected to a conductivity sensor placed to intercept the second outlet connection 12, in order to verify the conductivity of the water treated by the flow condenser 10", and/or to a flow meter, placed to intercept the extraction pipe 6, in order to verify the water volume that has moved towards the user through the tap 7. The logic control unit can thus determine when to stop the functioning of the condenser 10", having correspondingly reached the desired purity level of the water in the tank 2 or having restored the water quantity requested by the user with new filtered water.

The pump 13 draws the water from the feeding pipe 5 of the water supply system 50 or from the tank 2 through its first inlet duct 3, balancing the pressure of the tank 2 with that of the water supply system 50. In the case of functioning of the condenser 10" in service step for producing filtered water, the overpressure created by the pump 13 in the tank 2 pushes the liquid contained therein to close the circulation circuit on the same pump 13.

Otherwise, in the case of functioning of the condenser 10" in regeneration step, with the passage of a washing flow through the condenser 10', the feeding of the water to the pump 13 will substantially arrive from the water supply system 50 since the second outlet connection 4 is closed downstream by the tap 7 and by the first check valve 16. Preferably, the feeding pipe 5 of the water supply system 50 is intercepted by a self-cleaning filter 22, in particular of mechanical type, e.g. with micronet, placed to intercept the feeding pipe 5 in order to remove possible particles and contaminants present in the water and avoid obstructing the filtering unit, especially if constituted by a reverse osmosis membrane filter 10'.

Such filter 22 is optional, it does not require high maintenance and has net meshes preferably comprised in the range of 25-50 micron.

Advantageously, the feeding pipe 5 is further intercepted, in a per se conventional manner, by a disconnector 23 adapted to prevent the water of the desalination plant 1 from returning into the water supply system 50.

Also forming the object of the present invention is a method for desalinating water of a water supply system, by means of the plant 1, in particular but not exclusively of the type described above, of which reference will be made for the sake of descriptive simplicity.

In accordance with the method object of the present invention, the desalination of the water occurs by means of at least one storage step, wherein with the tap 7 closed, the circulating means 13 force a water flow to be treated to pass from the second inlet connection 11 to the second outlet connection 12 through the filtering unit 13, producing a filtered water flow which flows through the first outlet connection 4, being progressively stored with a corresponding volume of filtered water in the tank 2 in an immiscible manner, according to a filling direction V1 of the tank 2 directed from the first outlet connection 4 to the first inlet connection 3.

At least one operating consumption step is then provided, wherein, with the tap 7 open, the feeding pipe 5 of the water supply system 50 forces a water flow intended for use to flow through the tank 2 from the first inlet connection 3 towards the first outlet connection 4 through the extraction pipe 6, causing the at least partial evacuation of the water volume that was previously filtered and stored in the tank 2 in an immiscible manner, according to an evacuation direction V2 opposite the filling direction V1.

If the filtering unit 10 is obtained with at least one flow-through condenser 10" of the type described above, then during the abovementioned storage step, the condenser 10" is cyclically subjected to:
- a service step, wherein a power supply unit charges with different polarities the electrodes of the cell and the water flow to be treated is forced to pass through the charged electrodes of the cell with a progressive accumulation of the ionized particles on the electrodes;
- a regeneration step, wherein, with the electrodes deactivated, a washing fluid flow is forced to pass through the cell with consequent removal of the ionized particles accumulated on the electrodes.

More in detail, during the service step, the solenoid valve 15 is closed and the water flow to be treated is forced by the circulating means 13 to pass from the second inlet connection 11 to the second outlet connection 12 through the cell of the condenser 10", producing a filtered water flow which flows through the first outlet connection 4, being progressively stored with a corresponding volume of filtered water in the tank for accumulating water 2 in an immiscible manner according to a filling direction V1 of the latter.

During the regeneration step, the solenoid valve 15 is open and the washing flow is forced by the circulating means 13 to pass from the second inlet connection 11 to the second outlet connection 12 and then through the drain duct 14. The first check valve 16, during the aforesaid regeneration step, prevents the draining of the tank 2 through the second outlet connection 12.

Otherwise, in accordance with a variant embodiment of the method, object of the present invention, if the filtering unit 10 comprises a reverse osmosis membrane filter 10' of the type described above, then during the storage step of the plant 1 with the solenoid valve 15 closed, the water flow to be treated is forced to pass by the circulating means 13 through the membrane filter 10' from the second inlet connection 11 to the second outlet connection 12, producing a filtered water flow which flows through the first outlet connection 3, being progressively stored with a corresponding volume of filtered water in the tank 2 in an immiscible manner according to a filling direction V1 of the latter. In accordance with the latter embodiment, the method that is the object of the invention also provides at least one regeneration step, wherein with the solenoid valve 15 open, a washing fluid flow is forced to pass through the membrane filter 10', causing a consequent removal of the encrustation deposits accumulated on the membrane of the filter 10'. The washing flow is thus in this step forced by the circulating means 13 to pass from the second inlet connection 11 to the second outlet connection 12 and then through the drain duct 14. During the aforesaid regeneration step, the first check valve 15 prevents draining the tank 2 through the second outlet connection 12.

The finding thus conceived therefore attains the preset objects.

Of course, in the practical achievement thereof, the finding can also assume forms and configurations and configurations different from those illustrated above, without departing from the present protective scope.

In addition, all details can be substituted by technically equivalent elements, and the size, shapes and materials employed can be of any type according to requirements.

The invention claimed is:

1. A plant for desalinating water of a water supply system, the plant comprising:
    at least one tank for accumulating filtered water in an immiscible manner with water already contained in the at least one tank, wherein the at least one tank is provided with a first inlet connection and with a first outlet connection respectively connected to a feeding pipe connected to the water supply system in order to supply the plant with the water from the water supply system and to an extraction pipe which transports the filtered water intended for use and is intercepted by at least one tap;
    at least one filtering unit for filtering the water provided with a second inlet connection and a second outlet connection, wherein the at least one filtering unit is connected in parallel to the at least one tank, with the second inlet connection and the second outlet connection respectively hydraulically connected to the first inlet connection and the first outlet connection of the at least one tank;
    a circulating means which can be activated to force the water to be treated to pass from the second inlet connection to the second outlet connection through the at least one filtering unit, the at least one filtering unit producing the filtered water which flows through the first outlet connection so that a corresponding volume of the filtered water is stored in the at least one tank according to a filling direction of the at least one tank directed from the first outlet connection to the first inlet connection;
    the feeding pipe of the water supply system forcing, with the tap at least partially open, the filtered water intended for use to flow through the at least one tank from the first inlet connection to the first outlet connection towards the extraction pipe causing at least a partial evacuation of the filtered water stored in the at least one tank in an evacuation direction opposite the filling direction;
    wherein the plant further comprises a duct for draining a washing flow, wherein the drain duct is intercepted by a solenoid valve and is hydraulically connected to the at least one filtering unit to remove encrustation deposits therefrom;
    wherein the plant further comprises a first check valve intercepting the second outlet connection in order to prevent the at least one tank from draining through the second outlet connection when the solenoid valve is open;
    wherein the at least one filtering unit comprises at least one flow-through condenser which comprises a plurality of electrodes electrically connected to a power supply unit;
    wherein the at least one filtering unit is connected to the second outlet connection which transports the water flow that has passed through the at least one flow-through condenser;
    wherein the second outlet connection is divided into at least one service duct and the drain duct, wherein the at least one service duct is intercepted by the first check valve and hydraulically connected to the first outlet connection in order to convey the filtered water treated by the condenser to the at least one tank, and wherein the drain duct is intercepted by the solenoid valve connected to a drain of the water supply system and susceptible of conveying a washing flow of the at least one flow-through condenser;
    wherein the plant further comprises a conductivity sensor which is placed to intercept the second outlet connection and is configured for verifying conductivity of the filtered water treated by the at least one flow-through condenser;
    wherein the plant further comprises a logic control unit which is connected to the conductivity sensor and is configured for determining when to stop functioning of the at least one flow-through condenser at a desired purity level of the filtered water in the at least one tank.

2. The plant for desalinating water of a water supply system according to claim 1, wherein said circulating means is mounted on said second inlet connection or on said second outlet connection.

3. The plant for desalinating water of a water supply system according to claim 1, the plant further comprising two or more tanks for accumulating the filtered water in an immiscible manner connected in parallel to each other with the respective first inlet connections connected to a common inlet manifold and with the respective first outlet connections connected to a common outlet manifold.

4. The plant for desalinating water of a water supply system according to claim 3, wherein said common inlet manifold is connected to said first inlet connections of the respective tanks for accumulating the filtered water in an immiscible manner by means of corresponding:
    filling branches, each of the filling branches are intercepted by a flow adjuster adapted to uniformly distribute the filtered water coming from said at least one filtering unit by means of said second outlet connection to the respective first outlet connections of said tanks for accumulating the filtered water in an immiscible manner;

emptying branches connected in parallel to said filling branches, each of the emptying branches are intercepted by a third check valve and adapted to by-pass said flow adjusters when said tap is open, and when the filtered water flow intended for use is flowing through said tank for accumulating the filtered water in an immiscible manner in said evacuation direction opposite said filling direction.

5. The plant for desalinating water of a water supply system according to claim 3, wherein said common inlet manifold and said common outlet manifold are each provided with a plurality of connections for a hydraulic connection of a selectable number of tanks for accumulating the filtered water in an immiscible manner.

6. The plant for desalinating water of a water supply system according to claim 1, wherein said circulating means comprises at least one pump arranged on said second inlet connection, a second check valve being placed to intercept said second inlet connection upstream of said at least one pump.

7. The plant for desalinating water of a water supply system according to claim 1, the plant further comprising a mechanical filter placed to intercept said feeding pipe.

8. A method for desalinating water of a water supply system by means of the plant according to claim 1, the method comprises the following operating steps:

at least one storage step, wherein, with said tap closed, said circulating means forces the water to be treated to pass from the second inlet connection to the second outlet connection through the at least one filtering unit producing the filtered water which flows through the first outlet connection, so that a corresponding volume of the filtered water in the at least one tank, according to the filling direction of the at least one tank, is directed from the first outlet connection to the first inlet connection;

at least one consumption step, wherein, when said tap is open, the feeding pipe of the water supply system forces the filtered water intended for use to flow through the at least one tank from the first inlet connection towards the first outlet connection through the extraction pipe causing the partial evacuation of the filtered water stored in the at least one tank in the evacuation direction opposite the filling direction.

9. The method for desalination water of a water supply system according to claim 8, wherein the at least one filtering unit comprises the at least one flow-through condenser provided with at least one cell having facing electrodes, the at least one flow through condenser connected to the second outlet connection, wherein the second outlet connection is divided into at least one service duct and the drain duct, wherein the at least one service duct is intercepted by the first check valve and hydraulically connected to the first outlet connection in order to convey the filtered water treated by the condenser to the at least one tank, and wherein the drain duct is intercepted by the solenoid valve connected to a drain of the water supply system and susceptible of conveying the washing flow of the at least one flow-through condenser;

wherein during the storage step, the at least one flow-through condenser is cyclically subjected to:

at least one service step, wherein the power supply unit charges the electrodes of the at least one cell with different polarities, and said water to be treated is forced to pass through the charged electrodes; during the at least one service step, said solenoid valve being closed and said water to be treated being forced by said circulating means to pass from said second inlet connection to said second outlet connection through said at least one cell, producing the filtered water which flows through the first outlet connection, such that a corresponding volume of the filtered water in the at least one tank is stored according to the filling direction of the at least one tank; and at least one regeneration step, wherein, with the electrodes deactivated, a washing fluid flow is forced to pass through the at least one cell with consequent removal of the ionized particles accumulated on the electrodes; during the regeneration step, the solenoid valve being open and the washing fluid flow being forced by the circulating means to pass from said second inlet connection to said second outlet connection and then through said drain duct, said first check valve preventing the at least one tank from evacuating through the second outlet connection.

10. The method for desalination water of a water supply system according to claim 8, wherein the at least one filtering unit comprises at least one reverse osmosis membrane filter, the at least one reverse osmosis membrane filter is intercepted by the first check valve and is hydraulically connected to the first outlet connection of the at least one tank in order to convey the filtered water treated by the at least one reverse osmosis membrane filter to the at least one tank, the at least one reverse osmosis membrane filter is hydraulically connected to the drain duct connected to the drain of the water supply system, the drain duct is susceptible of conveying a washing flow of the at least one reverse osmosis membrane filter; wherein during the storage step, said water to be treated is forced by the circulating means to pass, when the solenoid valve is closed, from the second inlet connection to the second outlet connection through the at least one reverse osmosis membrane filter, producing the filtered water which flows the first outlet connection such that a corresponding volume of the filtered water in the at least one tank is stored according to the filling direction of the at least one tank.

11. The method for desalinating water of a water supply system, according to claim 10, wherein the method comprises at least one regeneration step, wherein, when said solenoid valve is open, the washing fluid flow is forced to pass through said at least one reverse osmosis membrane filter with consequent removal of encrustation deposits, said washing fluid flow being forced by said circulating means to pass from said second inlet connection to said second outlet connection and then through said drain duct, said first check valve preventing said at least one tank from evacuating through said second outlet connection.

* * * * *